United States Patent [19]

Shun-Yi

[11] Patent Number: 5,495,671
[45] Date of Patent: Mar. 5, 1996

[54] APPARATUS FOR MULTI-SHAPE CUTTING

[76] Inventor: Wang Shun-Yi, F1.11-2, No. 7. Sec. 3, Hsin Sheng N. Rd., Taipei, Taiwan

[21] Appl. No.: 313,874

[22] Filed: Sep. 28, 1994

[51] Int. Cl.⁶ .................................................. B26F 1/04
[52] U.S. Cl. .................................................. 30/364; 30/358
[58] Field of Search .................................. 30/278, 279.2, 30/314, 315, 358, 364; 83/552, 685, 686

[56] References Cited

U.S. PATENT DOCUMENTS

| | | | |
|---|---|---|---|
| 440,835 | 11/1890 | Wickman | 83/552 |
| 521,358 | 6/1894 | Backus | 30/364 |
| 1,500,576 | 7/1924 | Cusi | 30/358 |
| 3,087,367 | 4/1963 | Semier | 30/358 |
| 3,906,633 | 9/1975 | Inoue | 30/358 |
| 5,067,242 | 11/1991 | Singer | 30/364 |

*Primary Examiner*—Hwei-Siu Payer
*Attorney, Agent, or Firm*—Morton J. Rosenberg; David I. Klein

[57] ABSTRACT

An apparatus for forming a selectively-shaped paper cut-out comprises a cutting table assembly which has a plurality of cutting means disposed therein, In one embodiment, the cutting table assembly is rotatably mounted to a base member within a U-shaped support bracket extending therefrom. In another embodiment, the cutting table assembly is not mounted on a base member; rather, it has the necessary actuating means in place to independently actuate each of the plurality of cutting means provided therein. To use the apparatus, a user simply turns the cutting table assembly to choose the desired shape, inserts a sheet of paper into the assembly, and punches out the desired shape.

9 Claims, 4 Drawing Sheets

A-A SECTION 5,495,671

APPARATUS FOR MULTI-SHAPE CUTTING

BACKGROUND OF THE INVENTION

The present invention relates to an apparatus for multi-shape cutting, particularly referring to an apparatus which has several cutting means to punch out of color paper a selectively-shaped paper cutout.

Referring to the issue of No. 195,243 of the Patent Bulletin of the Republic of China, Taiwan: An Apparatus for Cutting Simple Shape Color Papers for Children, such discloses a device that cuts color paper to form color paper pieces of a certain shape. The device disclosed there is of interest to children and safe for their use, but each such device can only form color paper pieces of one shape. Thus, additional ones of such devices having different cutting means are necessary to form color paper cutout pieces having different shapes. This causes unnecessary disorder and confusion when paper cutouts of more than one shape are to be formed.

SUMMARY OF THE INVENTION

It is a main object of this invention to provide an apparatus for multi-shape cutting to cut, or punch out, from color paper, selectively-shaped paper cutout pieces. Another object is to provide an apparatus that is not only convenient to use, but eliminates disorder and confusion resulting from comparable use of prior art devices.

A further object of this invention is to provide an apparatus for multi-shape cutting that comprises a stand-alone cutting table assembly which is operable without being mounted on a base member, and which has a plurality of cutting means that may be independently actuated.

According to a broad aspect of the present invention, an apparatus for multi-shape cutting comprises a cutting table assembly having a plurality of uniquely-shaped cutting means and a base member having a U-shaped bracket portion for rotatably capturing the cutting table assembly. To use the apparatus, the user simply turns the cutting table assembly to select the desired shape of the paper cutout, inserts a sheet of color paper into the cutting table assembly, and actuates the selected cutting means.

DETAILED DESCRIPTION OF THE PREFERRED EMBODIMENT

Figure 1:
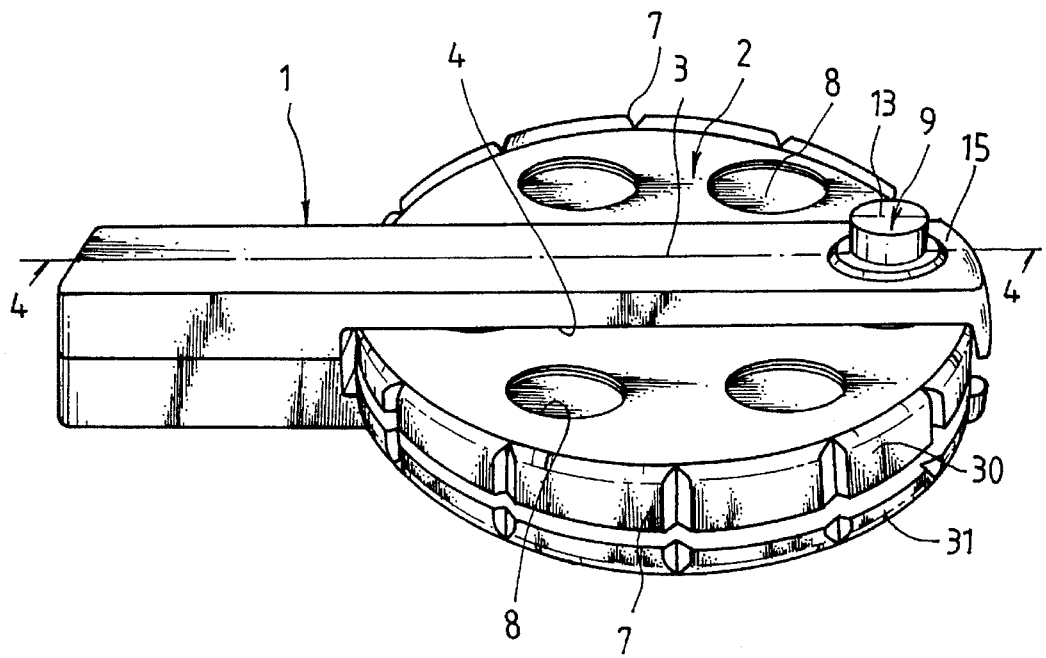
FIG. 1 is a perspective view of the preferred embodiment of the present invention.
Figure 2:
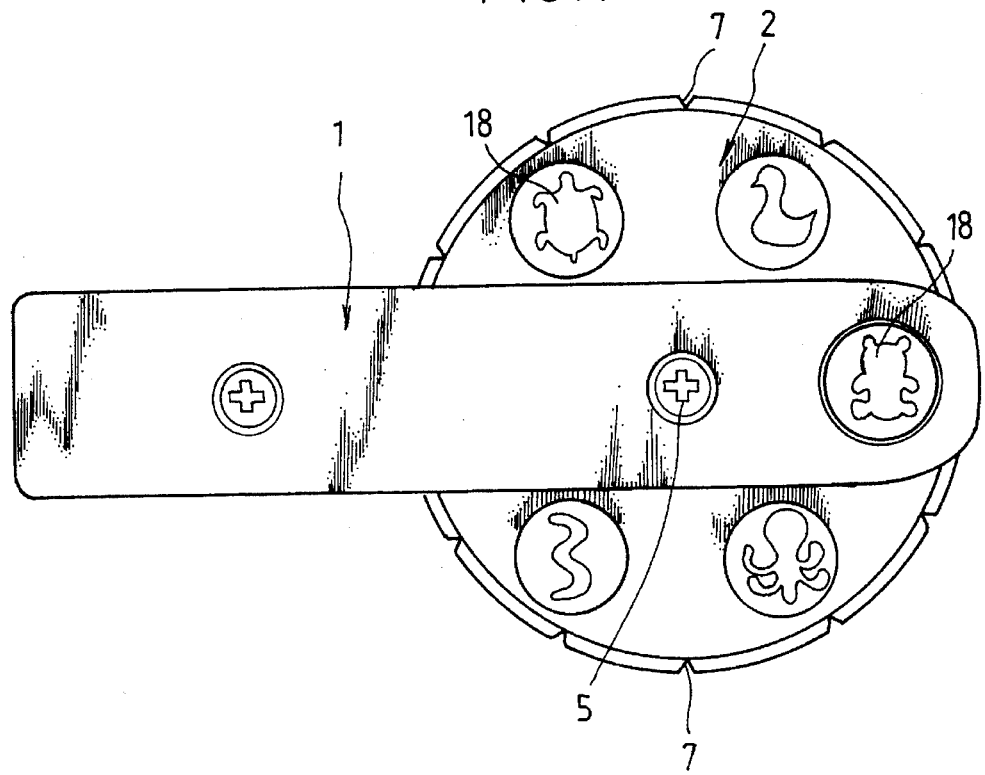
FIG. 2 is an elevational view of the preferred embodiment of the present invention.
Figure 3:
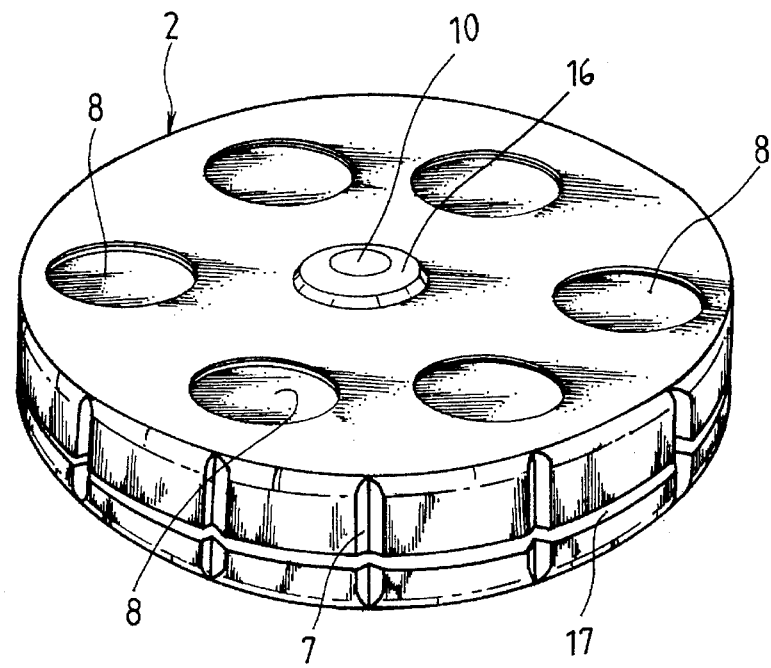
FIG. 3 is a perspective view of the cutting table assembly.

Referring to FIGS. 1, 2, 3, and 4, there is shown, generally, a base member 1 and a cutting table assembly 2. The base member 1 has a U-shaped bracket-like front part 3 extending therefrom. The front part 3 has a connecting part 4 to which a connecting means 5 couples to rotatably capture the cutting table assembly 2 within the bracket-like front part 3. Along the inside wall of the connecting part 4, there is provided a locking pin 6, spring-biased to extend outward as shown. The tip of this locking pin 6 engages one of a plurality of grooves 7 formed in the side rim of the cutting table assembly 2. The cutting means 8 and the punching means 9 are both spring-biased and proximally disposed, as shown, in alignment with one another, such that when the user punches the punching means 9 downward, the cutting means 8 will, in turn, be actuated downward to cut out of color paper 25 a selectively-shaped color paper cutout 24 (as shown in FIG. 5).

Figure 4:
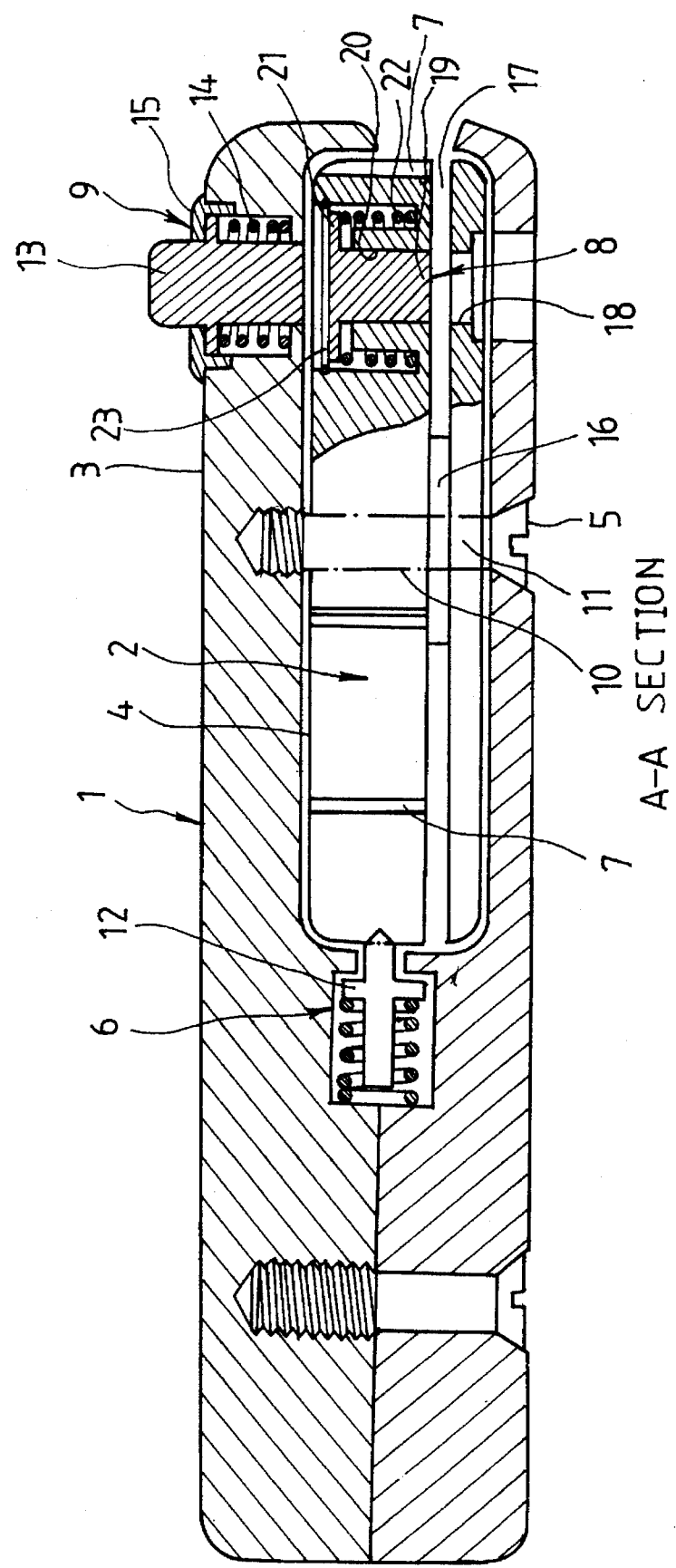
FIG. 4 is a cross-sectional view of the preferred embodiment of the present invention taken along Line 4—4 of FIG. 1.

Referring to FIG. 4, the connecting means 5 passes through a central connecting hole 10 to threadedly engage and fasten to the connecting part 4 of the base member 1. The connecting means 5 thus functions as the axial shaft of the cutting table assembly 2 which is captured thereby to be rotated when an external force is applied to move the desired cutting means 8 into the cutting position. The connecting means 5 is preferably an elongate threaded screw 11.

Locking pin 6 is inlaid within the connecting part 4 of the base member 1, and biased to extend outwardly by a spring device 12. In the side rim portion of the cutting table assembly 2 is formed a plurality of vertically extending V-shaped chutes 7. The tension of spring device 12 is such that a rotating force applied to the cutting table assembly 2 by a child is sufficient to force the retraction of the locking pin 6 until the next chute 7 is brought into engagement therewith.

Figure 5:
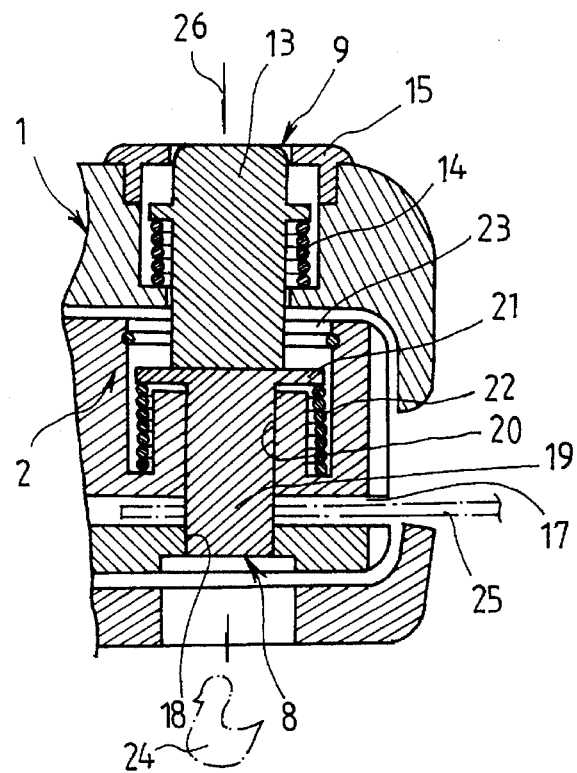
FIG. 5 is a cross-sectional view of the cutting means.

As FIGS. 1, 4 and 5 show, the punching means 9 is inlaid through an opening in the top of the connecting part 4 of the base member 1. The punching means 9 includes a button body 13, a spring 14, and a screw bolt 15. The button body 13 normally protrudes out of the base member 1 by force of the biasing spring 14. When a user pushes the button 13 downward, the bottom surface of button 13 pushes against the top surface of the cutting means 8 to actuate the cutting action (as shown in FIG. 5).

Referring again to FIGS. 1, 2, 3 and 4, the cutting table assembly 2 has a planar, round contour. At the center of the assembly 2 is a central connecting hole 10. The cutting table assembly 2 comprises parallel, round, dish-like upper and lower bodies 30, 31 separated by a central body 16, the space between the two parallel upper and lower bodies being provided for insert of the color paper to be cut. Around the periphery of the upper dish-like body 30 are formed a plurality of upper openings 20 for respectively receiving an upper mold body 19 of cutting means 8. Around the periphery of the lower dish-like body 31 are formed a plurality of lower openings 18. Each upper mold body 19 and its corresponding lower opening 18 share the common shape unique to a given cutting means 8. When a given cutting means 8 is actuated, its upper mold body 19 is forced down into lower opening 18 to produce a cutting action on a sheet of paper inserted therebetween. At the top of each upper mold body 19 is formed a shoulder portion 21 which conveys to upper mold body 19 forces applied via the punching means 9, the button body 13, and the punching spring 22. Over the top of the shoulder portion 21, there is provided a retaining ring 23 which prevents the upper mold body 19 from falling out through the top of the upper opening.

Referring to FIG. 5 which illustrates the operation of the cutting means 8, a user simply turns the cutting table assembly 2, inserts a sheet of color paper 25 into the space 17 between the cutting means 8 and the lower opening 18, and presses the punching means 9 in the direction indicated arrow 26. This forces the upper mold body 19 downward to cooperate with the lower opening 18 in effecting the necessary cutting action on the sheet of color paper 25, forming the selectively-shaped cutout 24. The recoiling action of the biasing and punching springs 14, 22 automatically return the punching and cutting means 9, 8 to their unactuated positions for a repeat of this process.

Figure 6:
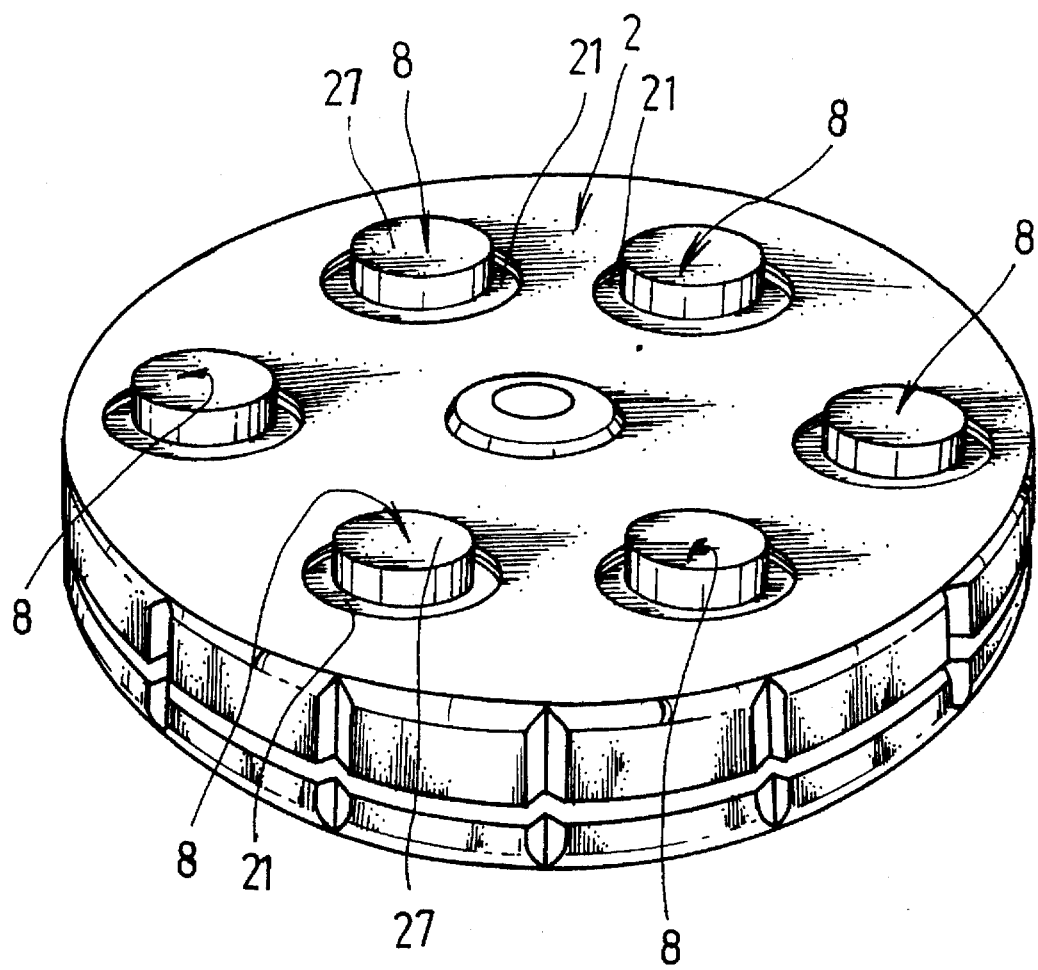
FIG. 6 is a perspective view of another embodiment of the present invention.

Referring now to FIG. 6, there is shown another embodiment of the present invention in which no base member is employed. The cutting table assembly 2 is configured as a stand-alone unit wherein a protruding portion 27 is formed on the shoulder portion 21 each upper mold body 19. A user may then independently actuate each of the cutting means provided on cutting table assembly 2 by depressing the respective protruding portion 27.

It is therefore shown that the cutting table assembly 2 of the present invention may be used independently or with a base member after minimal reconfiguration.

Although the present invention has been described and illustrated in detail, it is clearly understood that the same is by way of illustration and example only and is not to be taken by way of limitation, the spirit and scope of the invention being limited only by the terms of the appended claims.

I claim:

1. A paper punch device for forming a selectively-shaped paper cutout comprising:

(a) a cutting table assembly having an upper, a central, and a lower body member, each of said body members coaxially-aligned and coupled each to the other by a connecting means, said upper and lower body members being spaced apart by said central body member and having an axial central through opening for passage therethrough of said connecting means, said upper and lower body members being characterized by a substantially planar contour circumferentially defined about said axial central through opening by a side rim portion which has formed therein a plurality of elongate grooves, said upper body member having formed adjacent said side rim portion thereof a plurality of upper openings, said lower body member having formed adjacent to said side rim portion thereof a plurality of lower openings substantially aligned with said upper openings, each of said lower openings having a predetermined shape;

(b) a plurality of cutting means respectively and retractably captured within said upper openings, each of said cutting means including a mold body having a cutting surface opposing a corresponding one of said lower openings, said cutting surface being adapted to extend at least partially into said corresponding lower opening to cooperate therewith to form a paper cutout having said predetermined shape of said corresponding lower opening when said cutting means is actuated after a sheet of paper is inserted between said cutting surface of said mold body and said corresponding lower opening, said mold body being spring-biased in an upward direction to a retracted position and having formed thereon distal from said cutting surface a top shoulder portion for supporting said cutting means within a respective upper opening of said upper body member;

(c) a plurality of annular retaining rings coupled to said upper body member, each of said plurality of annular retaining ring being coupled to said upper body member adjacent said shoulder portion of a respective mold body for capturing said cutting means within a respective upper opening of said upper body member; and, (d) a base assembly for supporting said cutting table assembly, said base assembly having a main body and a pair of support bracket arms extending therefrom, said support bracket arms rotatably capturing said cutting table assembly therebetween, said connecting means coupled to said support bracket arms, said base assembly having a locking pin retractably protruding from said main body for releasably engaging in a selective manner at least one of said side rim portion grooves of said upper and lower body members of said cutting table assembly, said base assembly having punching means for actuating said cutting means.

2. The paper punch device as recited in claim 1 wherein said cutting surface is a planar surface protruding from said mold body of said cutting means toward said corresponding lower opening and having a perimeter of substantially the same shape as said predetermined shape of said corresponding lower opening.

3. The paper punch device as recited in claim 1 wherein said connecting means of said cutting table assembly is an elongate threaded screw.

4. The paper punch device as recited in claim 1 wherein said locking pin of said base assembly is spring-biased in an extended position.

5. The paper punch device as recited in claim 1 wherein said side rim portion grooves of said upper and lower body members of said cutting table assembly are V-shaped slots.

6. The paper punch device as recited in claim 5 wherein said locking pin has a V-shaped tip.

7. A paper punch device for forming a selectively-shaped paper cutout comprising:

(a) a cutting table assembly having an upper, a central, and a lower body member, each of said body members coaxially-aligned and coupled each to the other by a connecting means, said upper and lower body members being spaced apart by said central body member and having an axial central through opening for passage therethrough of said connecting means, said upper and lower body members being characterized by a substantially planar contour circumferentially defined about said axial central through opening by a side rim portion which has formed therein a plurality of elongate grooves, said upper body member having formed adjacent said side rim portion thereof a plurality of upper openings, said lower body member having formed adjacent to said side rim portion thereof a plurality of lower openings substantially aligned with said upper openings, each of said lower openings having a predetermined shape;

(b) a plurality of cutting means respectively and retractably captured within said upper openings, each of said cutting means including a mold body having a cutting surface opposing a corresponding one of said lower openings, said cutting surface being adapted to extend at least partially into said corresponding lower opening to cooperate therewith to form a paper cutout having said predetermined shape of said corresponding lower opening when said cutting means is actuated after a sheet of paper is inserted between said cutting surface of said mold body and said corresponding lower opening, said mold body being spring-biased in an upward direction to a retracted position and having formed thereon distal from said cutting surface a top shoulder portion for supporting said cutting means within a respective upper opening of said upper body member;

(c) a plurality of annular retaining rings coupled to said upper body member, each of said plurality of annular retaining rings being coupled to said upper body member adjacent said shoulder portion of a respective mold body for capturing said cutting means within a respective upper opening of said upper body member; and, (d) punching means coupled to each of said cutting means for actuation thereof.

8. The paper punch device as recited in claim 7 wherein said cutting surface is a planar surface protruding from said mold body of said cutting means toward said corresponding lower opening and having a perimeter of substantially the same shape as said predetermined shape of said corresponding lower opening.

9. The paper punch device as recited in claim 7 wherein said connecting means of said cutting table assembly includes an elongate threaded screw and a fastening nut adapted to mate therewith.

* * * * *